(12) United States Patent
Carr (10) Patent No.: US 9,817,130 B1
(45) Date of Patent: *Nov. 14, 2017

(54) RADIATION DOSIMETER WITH THERMAL RESET AND READOUT

(71) Applicant: William N. Carr, Raleigh, NC (US)

(72) Inventor: William N. Carr, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,151

(22) Filed: Jun. 18, 2017

Related U.S. Application Data

(60) Provisional application No. 62/493,147, filed on Jun. 24, 2016.

(51) Int. Cl.
*G01T 1/02* (2006.01)
*G01T 1/115* (2006.01)
*G01T 1/24* (2006.01)

(52) U.S. Cl.
CPC .............. *G01T 1/115* (2013.01); *G01T 1/026* (2013.01); *G01T 1/248* (2013.01)

(58) Field of Classification Search
CPC ...... H01L 31/028; H01L 31/1804; G01T 1/20
See application file for complete search history.

(56) References Cited

U.S. PATENT DOCUMENTS 9,006,857 B1 * 4/2015 Carr .................. H01L 27/14601
257/12

\* cited by examiner

*Primary Examiner* — Kiho Kim (57) ABSTRACT

A radiation dosimeter comprising a thermal micro-platform with a plurality of nanowires having phononic structures providing improved thermal isolation of the micro-platform. In embodiments, thermo-luminescent, MOS transistor and PIN diode sensors for x-ray, gamma, charged particles and neutron irradiation are disposed on the micro-platform. In a preferred embodiment the dosimeter is fabricated using a silicon SOI starting wafer.

20 Claims, 11 Drawing Sheets

PRIOR ART

RADIATION DOSIMETER WITH THERMAL RESET AND READOUT

STATEMENT OF RELATED CASES

This case claims priority to U.S. Provisional Patent Application 62/493,147 filed Jun. 24, 2016 which is incorporated herein by reference. If there are any contradictions or inconsistencies in language between this application and one or more cases that have been incorporated by reference that might affect the interpretation of the claims in this case, the claims in this case should be interpreted to be consistent with the language in this case.

FIELD OF THE INVENTION

The present invention pertains to a nanostructured radiation dosimeter.

BACKGROUND OF THE INVENTION

Wherever high energy radiation is used, for radiotherapy, industrial applications, materials testing, and high energy physics, the amount of energy deposited in matter (dose) needs to be quantified. Traditionally, dosimetry measurements of high accuracy involve off-line instrumentation evaluating the effects of radiation on films (radiographic or radiochromic), thermo-luminescent (TL) or semiconductor devices. Ionization chambers, optical devices and semiconductor devices also allow on-line, real-time dose measurement.

Examples of well known prior art relating to this invention include thermo-luminescent dosimetry (TLD) based on a TL material whereby high energy radiation deposits an electrical charge into energy levels within the bandgap of the host wide-bandgap TL semiconductor doped with an appropriate "color center" impurity element. An example of a thermo-luminescent (TL) material is calcium fluoride doped with Mg, Cu and P. A TL dosimeter material is generally sensitive to exposed energy over a range from 100 kev upward into Gev levels and with exposure to dose levels in hundreds of Gray. When stored at ordinary temperatures, the trapped charge stored within the TL sensor as a result of irradiation is semi-permanent. When a TL semiconductor is heated to temperatures in the range 150 to 600 degrees Centigrade the internal stored charge is dissipated through radiative recombination processes light is emitted. This light is usually in the ultraviolet or deep blue wavelength range. The light so emitted is detected generally with a photomultiplier tube and the resulting response signal is correlated against calibration data to specify the radiation dose.

Another example of prior art dosimetry is based on a sensing of high energy depositions directly within a semiconductor device of material typically of silicon. In the case of an MOS transistor (MOST) as the sensing element in a dosimeter, deposited charge creates and fills energy levels within the amorphous gate dielectric such as silicon dioxide. The sensitivity of gate oxide to radiation increases as the area and volume of the gate dielectric increases. The charge deposited by radiation changes the gate voltage threshold in the MOST. This change of threshold is semi-permanent at room temperature. The change of threshold voltage is determined by monitoring the current-voltage (IV) characteristic of the MOST at a low current level typically around 10 microAmp. The change of threshold voltage uniquely determines the radiation dose when "read out" at a calibrated temperature.

Another example of a prior art dosimeter is based on high energy deposited directly into a semiconductor PIN diode of material such as silicon. An example of fabrication detail for a silicon PIN diode is disclosed in U.S. Pat. No. 6,018,187 where the starting material is high resistivity ($\pi$) silicon. When a PIN diode is used as a dosimeter, deposited energy from x-ray or nuclear radiation displaces silicon atoms within the diode and creates recombination energy levels within the bandgap energy range of the semiconductor. The PIN diode is especially sensitive to damage from high energy gamma and neutron radiation. The density of the defect structures so created by energy deposited within the diode increases the reverse leakage current of the diode as the depletion region extends through the diode bulk. The change of reverse current is semi-permanent when the PIN diode is stored at room temperature. The change in reverse current leakage of the PIN diode when measured at a calibrated temperature uniquely determines the radiation dose.

In other prior art relating to the present invention structures that permit temperature control of a sensor device is disclosed in the form of micro-platforms of U.S. Pat. No. 9,236,552, U.S. Pat. No. 9,006,857, U.S. patent application Ser. No. 15/083,286 filed Mar. 29, 2016, and U.S. Pat. No. 6,091,050. Integrated electrical and phononic nanowires together with heated micro-platforms are disclosed in these patents and patent applications. This prior art is depicted in FIG. 1A, FIG. 1B, FIG. 2 and FIG. 3.

Figure 1A:
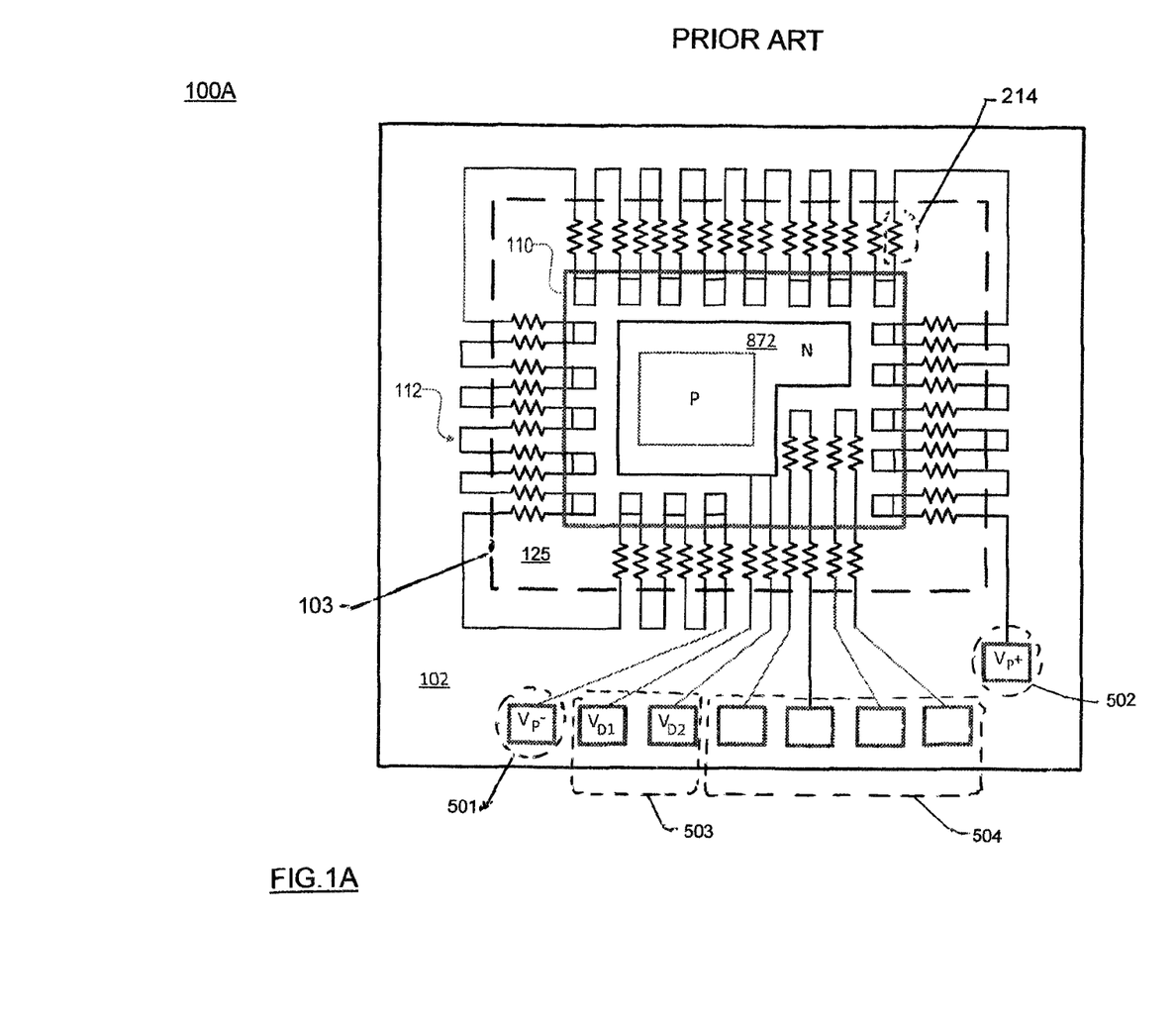
FIG. 1A is a plan view depicting a prior art micro-platform having supporting nanowires with an adaptation that reduces thermal conductivity.

FIG. 1A depicts a prior art micro-platform 110 with nanowires 214 supported by a surrounding support platform 102 is depicted in the plan view of FIG. 1A. The microplatform is suspended over cavity 125. In embodiments a series-connected array of thermoelectric elements 112 provide wither a Seebeck sensing or Peltier cooling function depending on the polarity of the supply voltage connected to pads 501 and 502. Another element 504 depicts a resistive structures such as a thermistor. In embodiments the microplatform is comprised of a diffused diode 872 providing a light sensor.

Figure 1B:
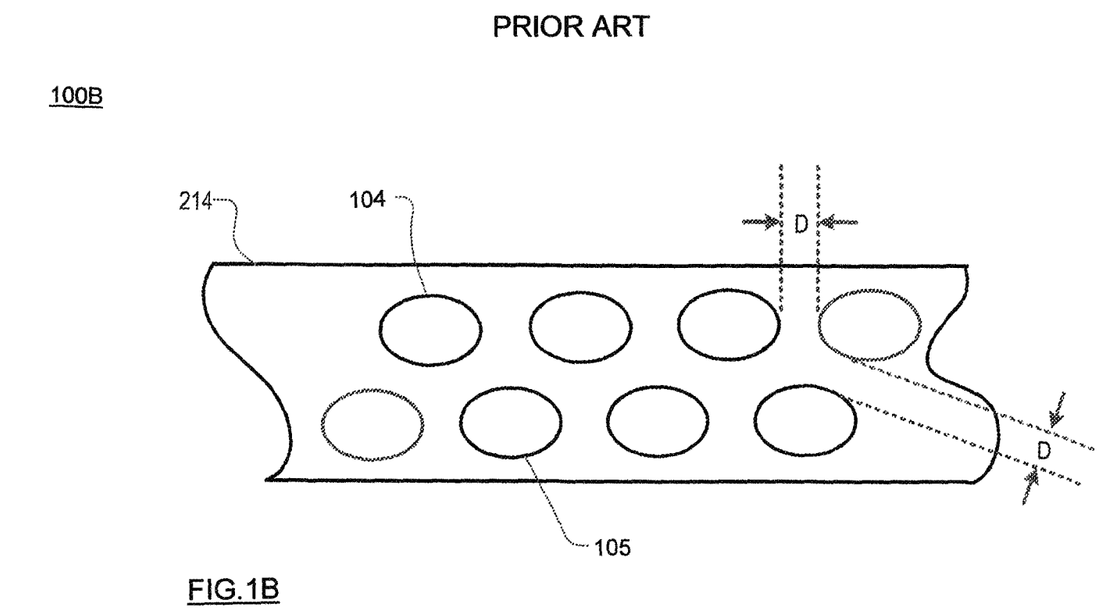
FIG. 1B is an illustrative view depicting a prior art nanowire adaptation that reduces thermal conductivity.

FIG. 1B depicts a prior art nanowire 214 with phononic structures 104 and 105. These are phononic structures that reduce the thermal conductivity of the nanowire by phononic scattering or phononic resonance.

Figure 2:
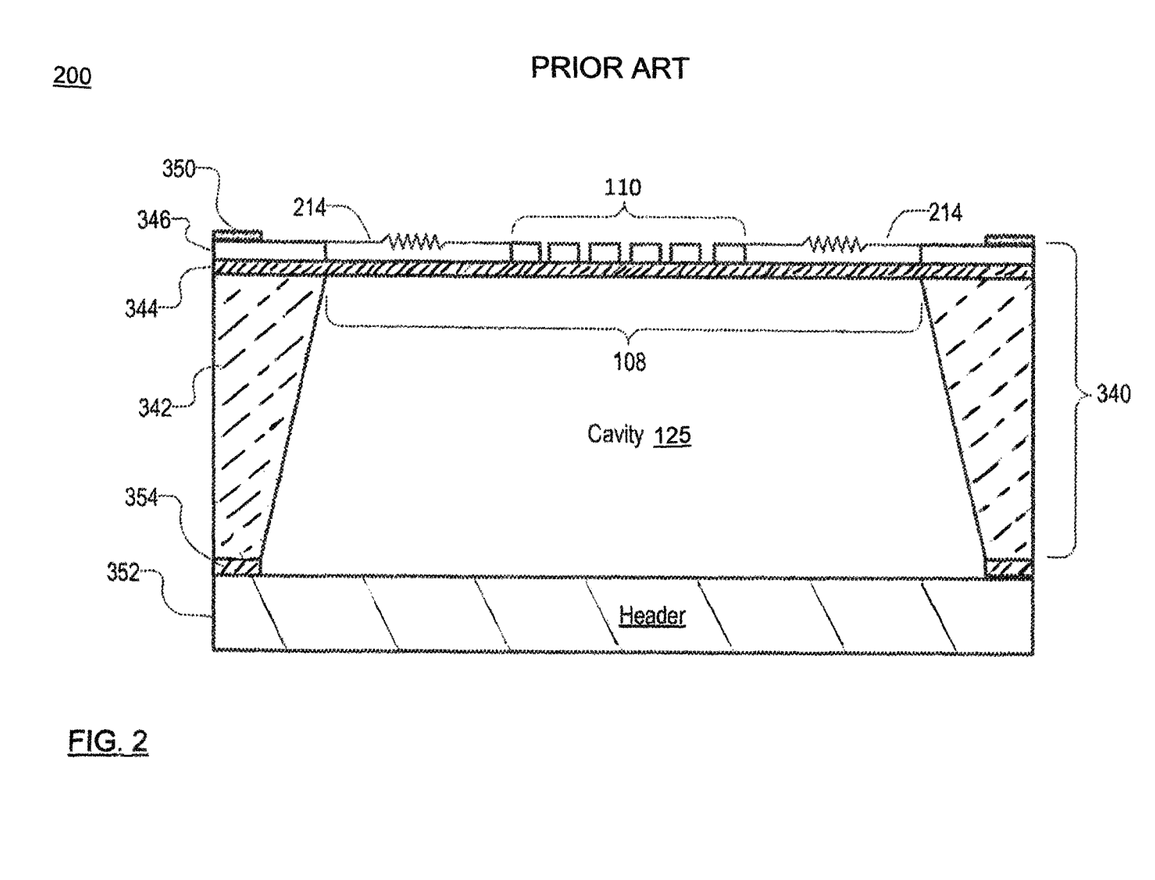
FIG. 2 is a cross-sectional view depicting the prior art micro-platform of FIG. 1 formed by backside etching of a semiconductor handle wafer.
Figure 3:
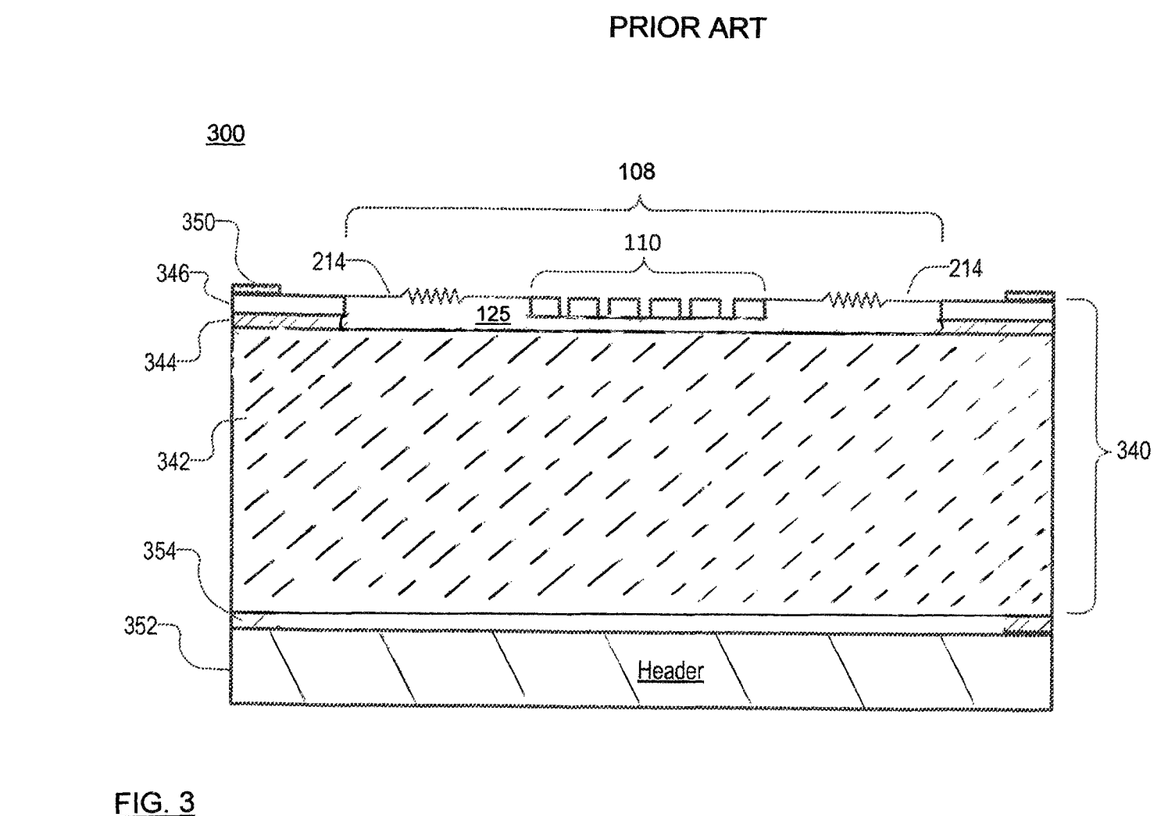
FIG. 3 is a cross-sectional view depicting the prior art micro-platform of FIG. 1 formed by topside etching of a semiconductor handle wafer.

FIG. 2 and FIG. 3 depict prior art cross-section view of a micro-platform 110 with tetherbeams 214 comprised of an active layer 346. In these illustrative depictions the surrounding support structuring 340 includes a dielectric film 344, handle wafer 342, bonding film 354 and a header 352. A patterned metallic contact 350 is variously connected to devices located in or on the microplatform in this depiction. In FIG. 2 the cavity 125 is created by backside etching of the starting wafer. In FIG. 3 the cavity 125 is created by frontside etching of the starting wafer.

In other prior art, such as U.S. Pat. No. 7,849,727 microplatforms are disclosed comprising a multiple-layer membrane dielectric structure without thermal-isolating nanowires.

SUMMARY OF THE INVENTION

The present invention provides a radiation dosimeter. The salient elements of the dosimeter include:
a thermal micro-platform having a support layer that is suspended by nanowires at a perimeter thereof, and a device layer disposed on a portion of the support layer.
an off-platform region, the off-platform region surrounding the micro-platform;

a plurality of nanowires comprised of a first layer having phononic scattering and/or phononic resonant structures physically adapted to reduce thermal conductivity and wherein a sensor sensitive to high energy radiation, a resistive heater and a temperature sensor are disposed in or on the micro-platform.

The dosimeter with a thermal micro-platform provides a type (1) adaptation, a specific calibrated temperature and thermal budget for readout of the high energy sensor, and a type (2) adaptation, an elevated temperature for annealing displacement defects and depleting trapped charge. In the adaptation with a controlled sensing temperature (1) with a PIN or MOST sensor, a more accurate readout is obtained using calibration data obtained at a specific temperature (generally in the 0 to 40° C. range. Also in the adaptation with a controlled sensing temperature (1), with a TL sensing material, readout of emitted light is obtained using a carefully controlled temperature-time cycling within a range up to 1000° C. With irradiated TL material the light emitted at elevated temperature is the result of radiative recombination thermally-stimulated by heating charge carriers trapped at energy levels within the energy gap of a wide bandgap semiconductor. In the adaptation (2) with heating over time within a temperature range up to 150 to 1000° C., radiation damage within a silicon MOST high energy sensor is thermally annealed providing a means of reset of electrical current-voltage IV characteristics to a pre-radiation condition.

With sensors and micro-platforms comprised of semiconductors that withstand temperatures higher than 600° C., such as silicon carbide and silicon nitride, the temperatures used in adaptations (1) and (2) can reach 1000° C.

In some embodiments the micro-platform is comprised of a Peltier cooling device which permits additional dosimeter adaptations of type (1).

In some embodiments the active structure of a micro-platform is formed of an semiconductor such as silicon and with transistor circuitry including devices such as CMOS formed within the micro-platform using standard foundry processes and tools. In some embodiments integrated circuitry such as CMOS is created in the surrounding support platform.

In embodiments the dosimeter is fabricated from a silicon SOI starting wafer.

In some embodiments the dosimeter is adapted to provide a wearable sensor interfaced with a mobile phone providing an assay and presentation of the sensor data.

In some embodiments the dosimeter is adapted to operate within a wired or wireless sensor network In operation, the dosimeter is exposed to radiation including x-rays, gamma rays, charged particles, and neutrons which deposit energy into the high energy sensor element. The incident radiation deposits energy into traps at the atomic- or nano-structural level and in some cases displaces atoms in the sensor creating new energy levels within a bandgap energy range in adaptations such as the PIN diode sensor. In all embodiments, the sensor is disposed on or in a micro-platform. The micro-platform provides an intermittently controlled temperature-time environment for the sensor.

In the case of a thermo-luminescent (TL) high energy sensor, the deposited energy stores charge into discrete energy levels within the bandgap energy range. When the TL sensor is heated increments of charge stored excite a radiative recombination process. This recombination process produces light generally in the ultraviolet or blue light spectral range. The temperature of the micro-platform is controlled by a resistive heater and a temperature sensor connected with closed-loop control circuitry. The dosimeter adapted for operation as a TLD requires precision control of the thermal budget of the micro-platform and TL material during a readout. Readout of the dosimeter adapted for operation as a TLD is obtained by monitoring the cumulative light flux emitted from the TL material and detection of the light flux with photonically-coupled pn semiconductor diode during the temperature-time readout cycle.

In the case of a PIN diode or MOST sensor, the radiation dose is "read out" at convenient times by monitoring the current-voltage characteristics of the sensor. The most sensitive region of a MOST sensor for monitoring doses of incident high energy radiation is the gate dielectric. Energy deposited into charge traps within the gate, especially the area nearest the source-drain channel, causes the threshold voltage of the MOST to shift with accumulated radiation dose. In this invention the semiconductor PIN diode or MOST sensor is disposed on a micro-platform which provides a controlled temperature for sensor readout at a specific calibration temperature. The temperature for readout of the micro-platform is generally controlled by the resistive heater but in some embodiments it is controlled by a Peltier cooler.

In adaptations wherein the high energy sensor element is a MOST the IV characteristics of the transistor can be reset to pre-irradiation conditions by heating to an elevated temperature sometimes as low as 150° C.

In this invention, phononic structuring of the first layer of nanowires provides an important reduction of thermal conductivity. In embodiments, the phononic structuring comprises holes as depicted in FIG. 1B. In other embodiments phononic scattering within nanowires is enhanced by other or additional structures at the atomic- or nano-level. These additional phononic scattering structures include sublattice structure such as obtained with silicon-germanium, bismuth-tellurium and other alloys. In some embodiments the phononic structures may comprise resonant phononic structures which restrict phonon propagation over a portion of the phonon mean-free-path continuum range present in semiconductor materials. The scattering structures within the first layer of nanowires may be at the scale of a few nanometers and include deposition of porous films of material such as silicon-germanium.

In embodiments a second film comprised of an electrical conducting metal overlays the first phononic layer of nanowires. The second metal film is comprised of, without limitation, tungsten, molybdenum, aluminum. In some other embodiments the metallic second layer is insulated from the first layer by a third layer comprised of a dielectric such as silicon nitride or silicon dioxide. A nanolayer of titanium is generally used with tungsten and molybdenum for adhesion enhancement to adjacent layers For thermally-isolating nanowires where the first layer of a nanowire is electrically conducting, the scattering structures are generally of dimension greater than the scattering path length of electrical charge carriers in the semiconductor. In embodiments where the first layer of a nanowire is electrically conducting, the ratio of electrical to thermal conductivity is generally preferred to be as large as possible.

To package the dosimeter with its micro-platform, the processed starting wafer is diced, using techniques which do not damage the thin platform area. For example, dicing can be performed using a $CO_2$ laser scribe tool. In some embodiments the micro-platform is disposed within a gas-filled or vacuum-sealed package for the purpose of reducing convective heating. Suitable gases for package backfilling include Kr, Ar, and Xe. In some embodiments where the micro-platform is disposed within a vacuum-tight package, a second heater is provided in thermal contact with a gettering material such as titanium particles. When powered externally the second heater so adapted provides a means of degassing within the vacuum volume.

DETAILED DESCRIPTION

Definitions

The following terms are defined for use in this disclosure and the appended claims:
"high energy radiation" means x-rays, gamma rays, charged particles, and neutrons originating from sources such as an x-ray tube, particle accelerator, and radioactive isotopes. Neutron energy range includes thermal neutrons.
"micro-platform" means a platform having dimensions of about 100 nanometers on a side up to about 1 centimeter.
"phononic structure" means a semiconductor structure adapted with phonon scattering or phonon resonating structures for the purpose of reducing thermal conductivity.
"nano-dimensioned" or 'nano-sized" means a structure whose largest dimension does not exceed 500 nanometers.
"nano-wire" means a structure providing support for a micro-platform having nano-dimensioned thickness and width each with an arbitrarily long length.
"sensor" means a device disposed in or on a micro-platform with sensitivity to high energy x-ray or nuclear radiation.
"photonic sensor" means a pn diode sensitive to light in the visible and ultraviolet wavelength range.

Figure 4A:
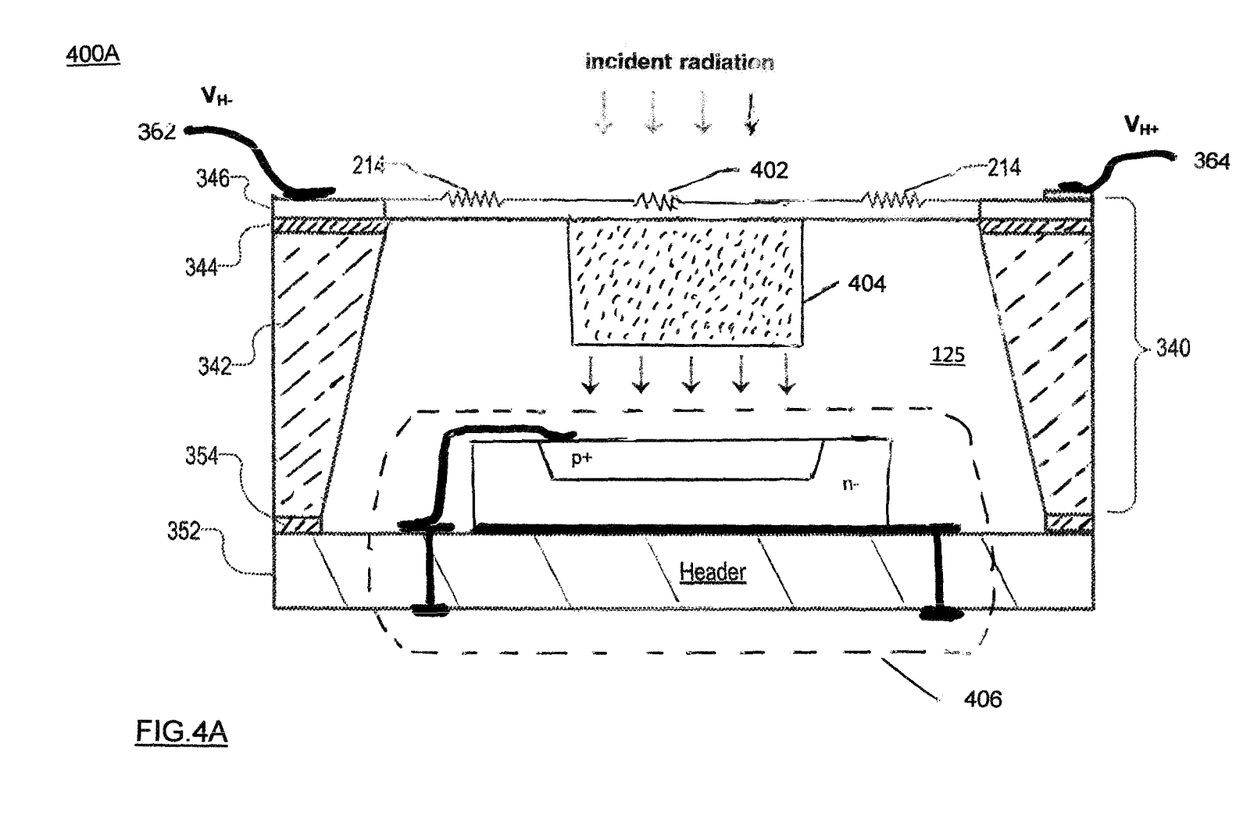
FIG. 4A is a cross sectional view depicting the radiation dosimeter wherein the micro-platform is comprised of a thermo-luminescent structure sensitive to high energy radiation and adapted with a separate semiconductor pn diode photonic sensor in accordance with embodiments of the invention.

FIG. 4A is a cross-sectional view depicting the dosimeter in embodiment 400A wherein the high energy sensor is a TL structure bonded to the micro-platform. The micro-platform is comprised of a heater 402 and nanowires 214 with a supporting platform structure 346. Photonic radiation emitted from the TL structure 404 is detected by the semiconductor pn junction diode 406. The semiconductor diode is fabricated to be radiation hardened against the x-ray and/or nuclear radiation of interest as appropriate. This illustrative embodiment is fabricated from a starting silicon SOI wafer comprised a patterned silicon dioxide layer 344, handle substrate 342 and bonding film 354 with attachment to a header 352. The micro-platform and nanowires are released from the underlying support 342 with a backside DRIE, TMAH or RIE etch process. In addition in embodiments the silicon dioxide layer 344 may also be removed from the cavity area using a vapor HF process.

Figure 4B:
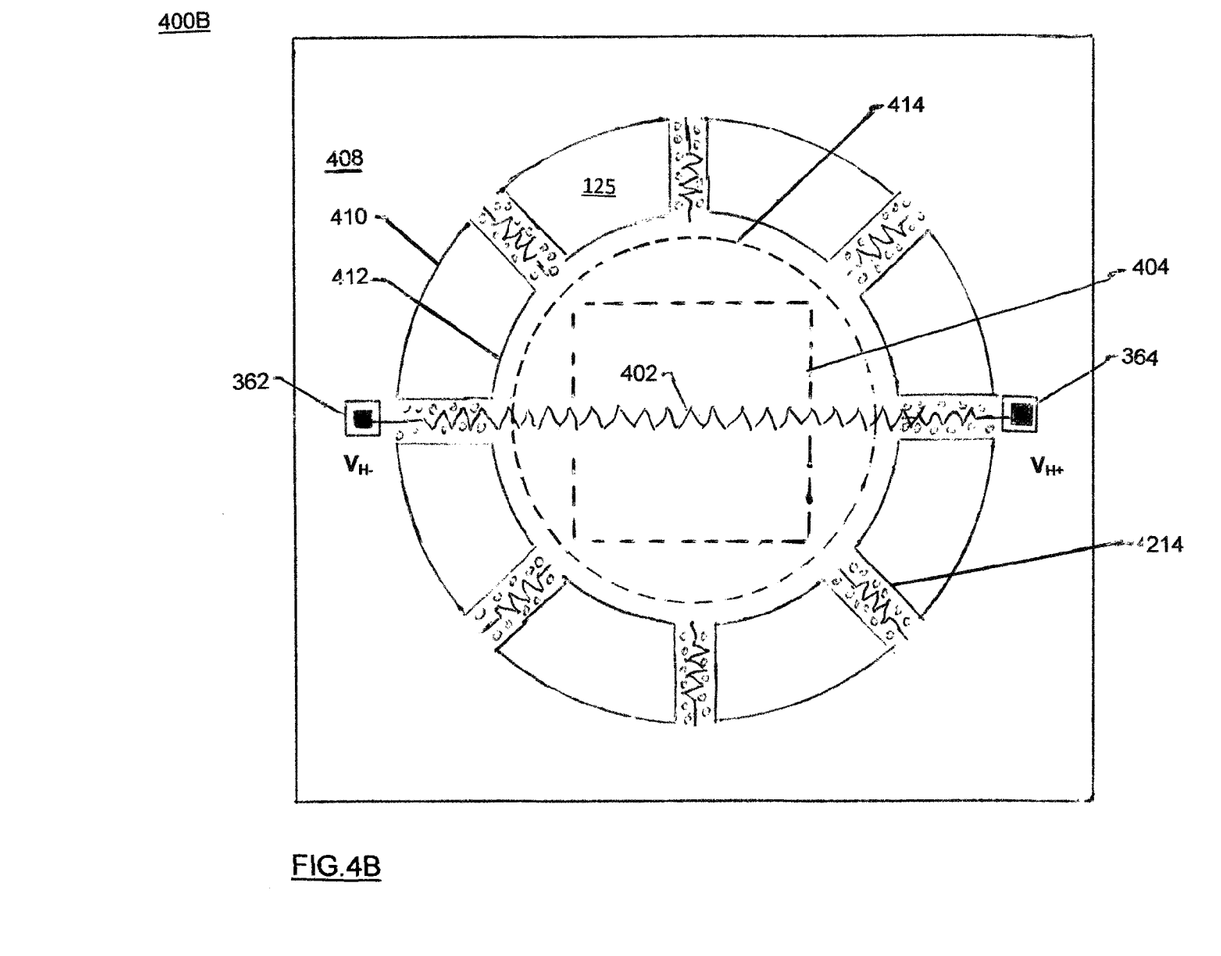
FIG. 4B is a plan view depicting the dosimeter of FIG. 4A.

FIG. 4B is a plan view depicting the structure of FIG. 4A wherein the TL structure 414 bonded to the micro-platform 412 is heated by resistive heater 402 with power supplied through pads 362 and 354 and nanowires 214. Supporting nanowires extend between the micro-platform 412 and surrounding support structure 410. The cavity 348 under the micro-platform 404 and nanowires 214 provides a further reduction in thermal conductivity between the support 410 and micro-platform 412. reduces the thermal nanowires 214 that are supplying power to the heater 402 generally are covered with a metal film of thin metal such as DC sputtered tungsten and lithographically patterned to provide a reduction in electrical resistance, especially for the resistive heater. In some embodiments a dielectric film such as silicon nitride, silicon oxynitride, or aluminum oxide is created between the metal film and the semiconductor portions of the nanowire with appropriate lithographic patterning. In some embodiments a CVD dielectric film such as silicon nitride or silicon oxynitride is patterned over the nanowires to provide a reduction of stress across the micro-platform.

Figure 5A:
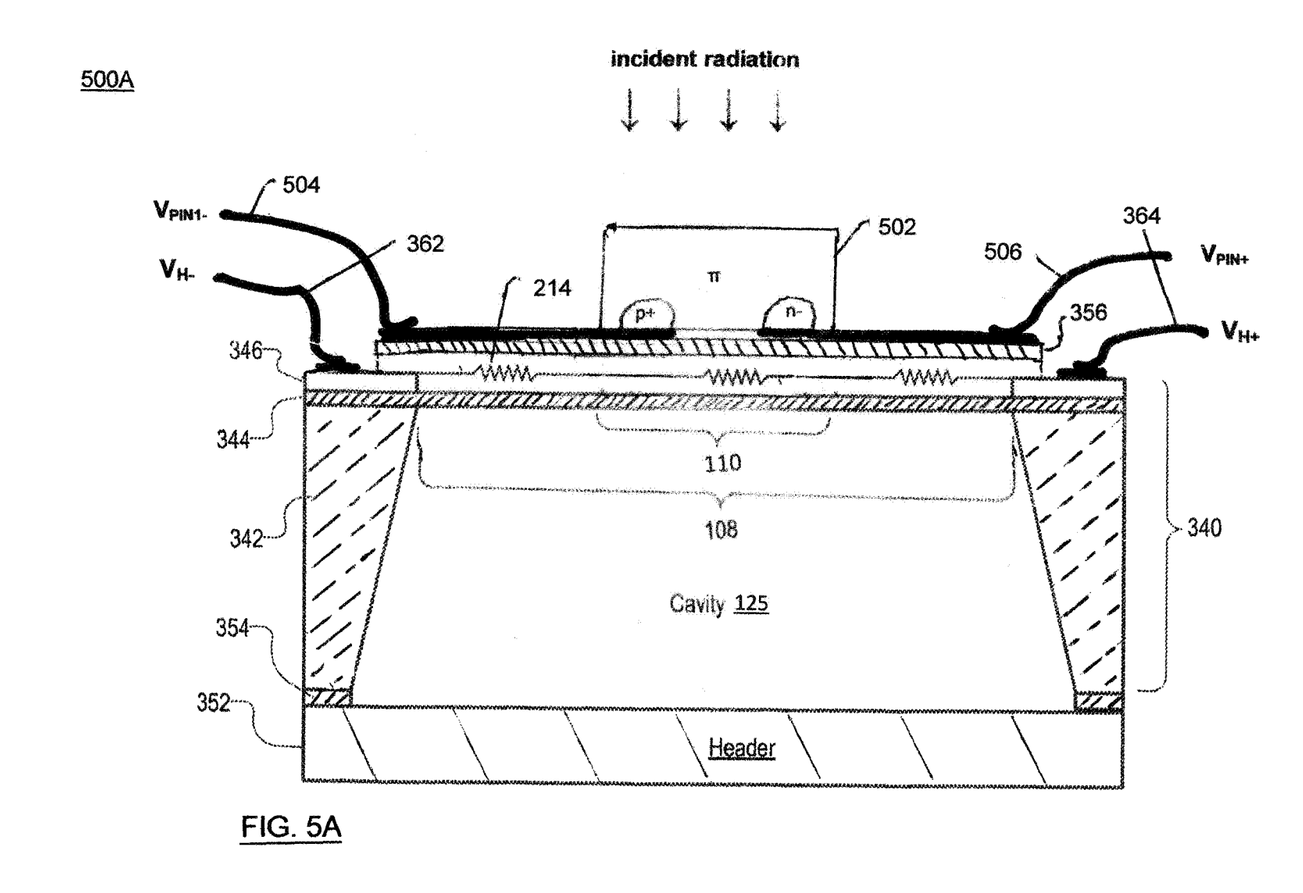
FIG. 5A is a cross-sectional view depicting the radiation dosimeter wherein the micro-platform is comprised of a semiconductor PIN diode sensitive to high energy radiation dose in accordance with embodiments of the invention

FIG. 5A is a cross-sectional view depicting the dosimeter adapted with a semiconductor PIN diode 502 as the high energy sensor. The sensor is disposed on the micro-platform 110 and connected to external circuitry via bonding wires 504 and 506. In this depicted embodiment the contacting metallic wires to the PIN diode 502 overlay the electrical connections to the heater on the phononic first layer of a nanowire 214. The upper cavity boundary structural area 108 is comprised of the micro-platform 110 and nanowires 214. The active layer 346, silicon oxide 344, and handle support 342 of the starting silicon wafer 340 enclose the patterned cavity 125. The film 354 bonds the patterned handle wafer 342 to the header 352

Figure 5B:
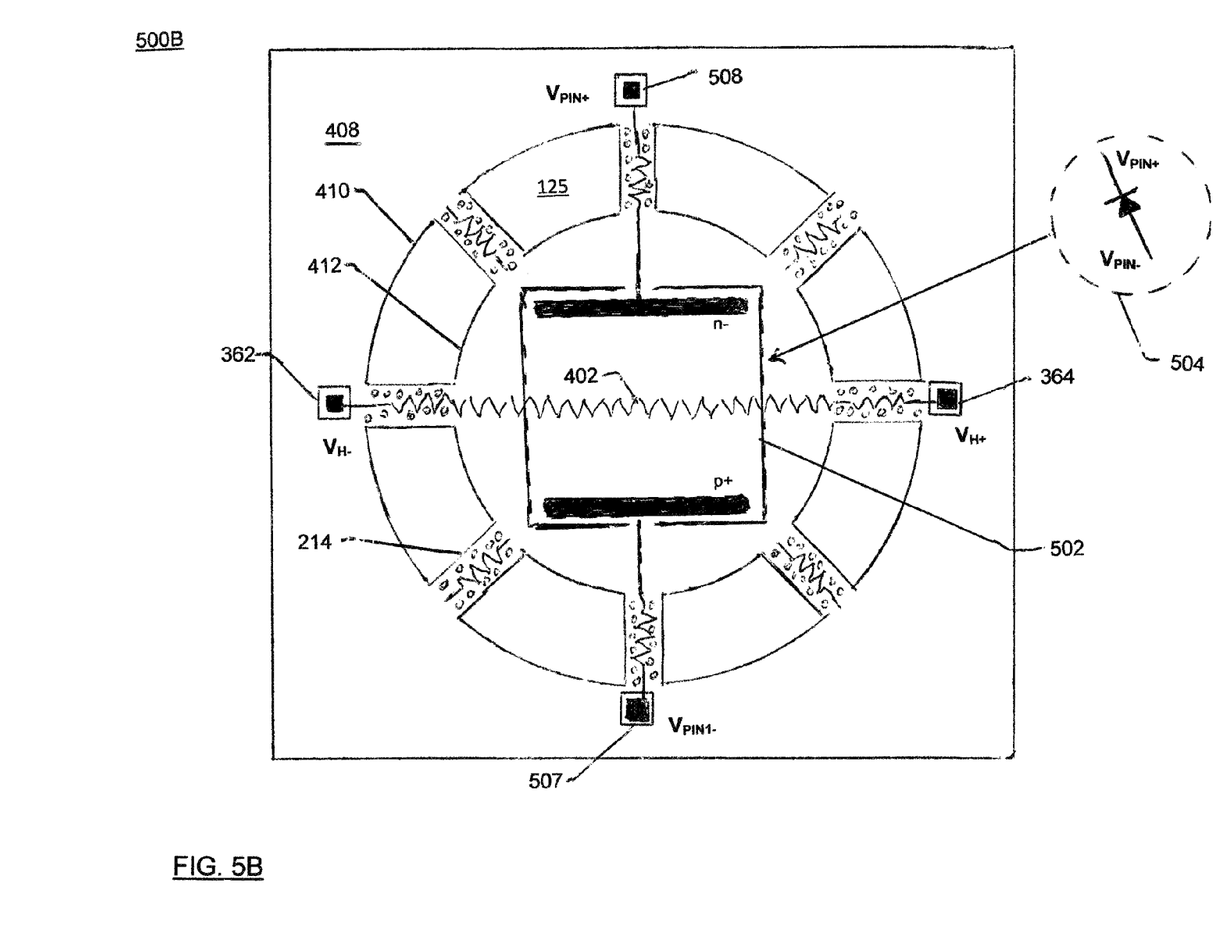
FIG. 5B is a plan view depicting a similar but slightly different embodiment of the dosimeter of FIG. 5A.

FIG. 5B is a plan view depicting a dosimeter adapted with a semiconductor PIN diode 502 as shown in the schematic 504 where the electrical connections 507 and 508 to the PN diode are routed over nanowires separate the heater nanowires 362 and 364. The micro-platform 412 is suspended via nanowires connected to the surrounding support platform 408 and suspended over cavity 125. Generally the nanowires supplying power to the heater are covered with a nanolayer of high temperature metal such as tungsten. In some embodiments the surrounding support platform electrical resistivity is so large that an insulating dielectric film is not needed to insulate the heater wire from parasitic electrical shunt conduction through the supporting platform 408. At least one of the connection traces to the PIN diode is insulated from the device layer by a patterned overlying tungsten film.

In embodiments, the PIN diode may be connected to a transimpedance amplifier to provide nanosecond response to prompt radiation. This feature is helpful, for ample, for follow-up monitoring after the alert indicating a high-dose is registered.

Figure 6A:
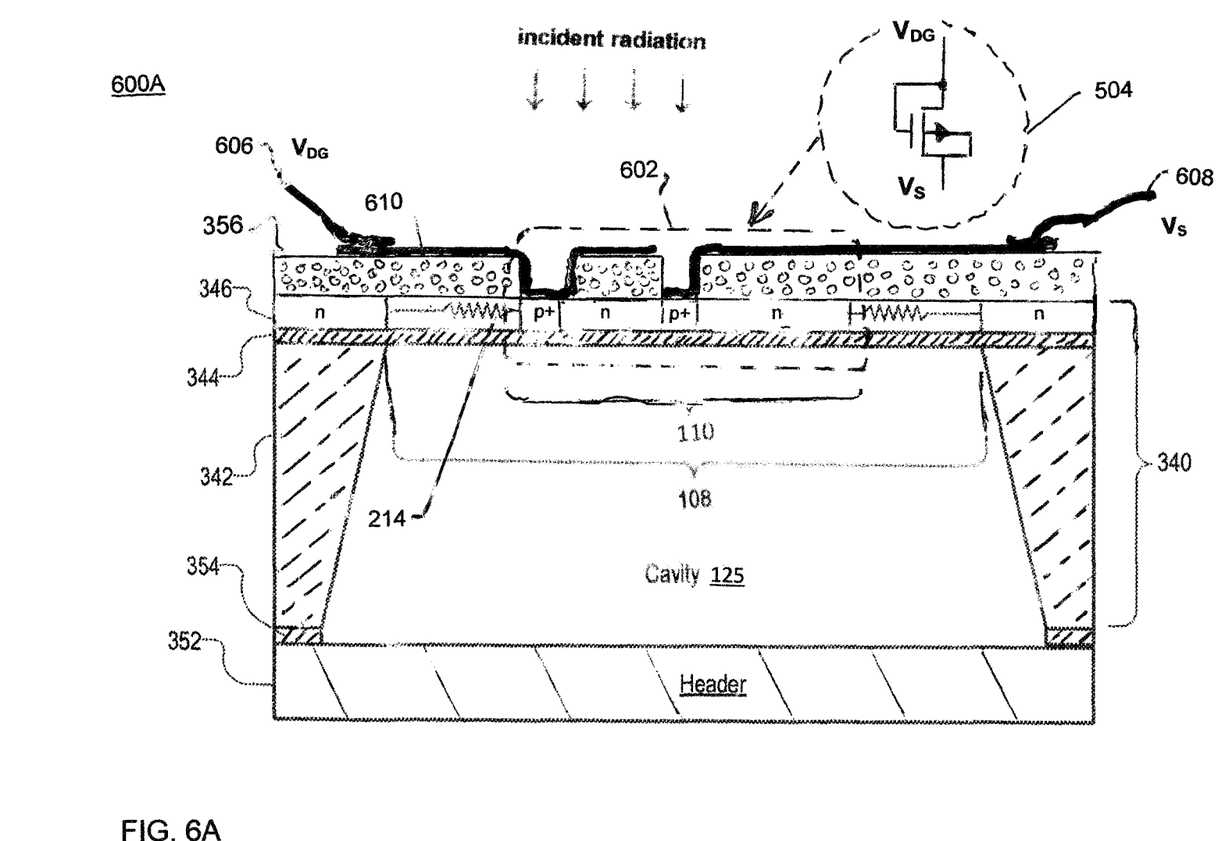
FIG. 6A is a cross-sectional view of a radiation dosimeter wherein the micro-platform is comprised of a semiconductor MOST sensitive to high energy radiation in accordance with embodiments of the invention.

FIG. 6A is a cross-sectional view of a dosimeter adapted to provide a MOST high energy sensor. In this embodiment the MOST is diode-connected 504 with the gate shorted to the drain. Wire 606 connects to the drain-gate and wire 608 connects to the transistor source. The micro-platform 110 area comprises the MOST and its two electrical connections The suspended structural area 108 is comprised of the micro-platform 110 and the nano-wires. The nanowire depicted provides a support for the metal connection with the MOST and the insulating film 356. The stacked components of the SOI starting wafer 340 include the device layer 346, the silicon dioxide layer 344, the handle wafer 342. The handle wafer 342 is bonded to the header 352 via bonding film layer 354. The surrounding support platform is 214 provide connection to the heater in this embodiment. The drain of the MOST surrounds the source and provides a guard ring against surface leakage. Incident radiation deposits energy into the gate dielectric of the MOST transistor causing a shift in threshold voltage $V_T$.

Figure 6B:
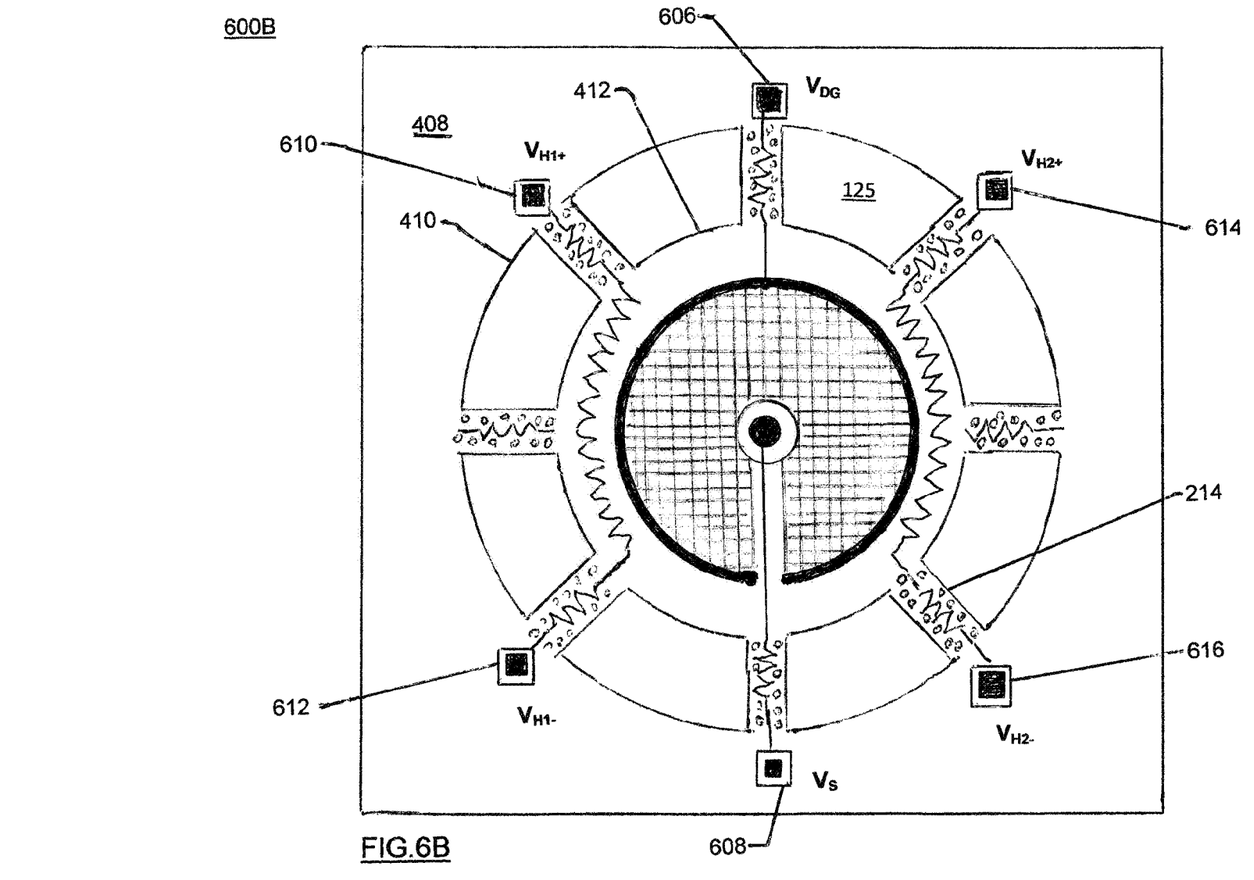
FIG. 6B is a plan view depicting the dosimeter of FIG. 6A.

FIG. 6B is a plan view depicting the dosimeter of FIG. 6A adapted with a MOST sensor. The wired bonding pad connections 606 and 608 to the MOST are disposed on the surrounding support platform 408 The MOST connections are made through nanowires separate from the heater connections. A first heater is connected through pads 610 and 612 and another heater is connected to external power through pads 614 and 616. Both electrically conducting and non-conducting nanowires support the micro-platform 412 and are tethered to the surrounding support platform 408 at periphery 410.

Figure 7:
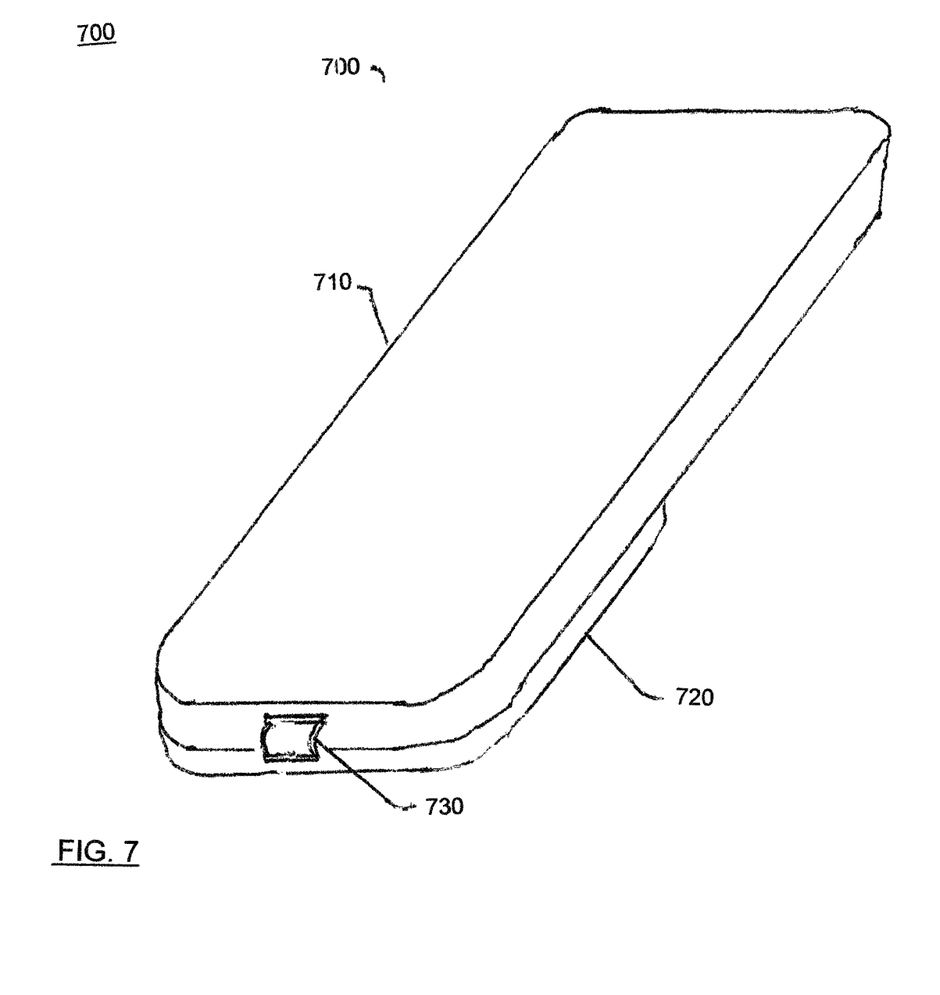
FIG. 7 is a perspective view of a radiation dosimeter disposed on the backside of a mobile phone in accordance with embodiments of the invention.

FIG. 7 is a perspective view of the dosimeter adapted with support circuitry as a clip-on to the backside of a mobile phone 710. In this embodiment the dosimeter is adapted with additional circuitry as module 720. The dosimeter function is powered from and communicates with the mobile phone through the standard micro-USB bus 730. In embodiments alerts are communicated when the radiation dose level exceeds a predetermined level or levels.

It is to be understood that although the disclosure teaches many examples of embodiments in accordance with the present teachings, many additional variations of the invention can easily be devised by those skilled in the art after reading this disclosure. As a consequence, the scope of the present invention is to be determined by the following claims.

What is claimed is:

1. A radiation dosimeter comprising:
a thermal micro-platform, the micro-platform having a support layer that is suspended by a plurality of nanowires at a perimeter thereof, and a device layer disposed on a portion of the support layer;
an off-platform region, the off-platform region surrounding the micro-platform;
wherein the plurality of nanowires comprised of a first layer having phononic scattering and/or phononic resonant structures physically configured to reduce thermal conductivity and
wherein the micro-platform is comprised of a high energy sensor, a resistive heater and a temperature sensor.

2. The dosimeter of claim 1 wherein the high energy sensor is comprised of a first semiconductor device comprising one of a PN diode, PIN diode, or MOS transistor.

3. The dosimeter of claim 1 wherein the high energy sensor is comprised of a second thermo-luminescent device comprising a photonic emitter and with a semiconductor photodiode disposed nearby receiving photonic radiation from the thermo-luminescent emitter.

4. The dosimeter of claim 1 wherein the resistive heater is powered from an external power source providing an elevated temperature for one or more of readout with a thermo-luminescent sensor, reset of the sensor sensitivity and calibration of the sensor.

5. The dosimeter of claim 1 wherein the high energy sensor is comprised of a semiconductor device comprising one of a PN diode or a PIN diode having sensitivity to a transient dose high energy radiation.

6. The dosimeter of claim 1 wherein a portion of the resistive heater is a metallic film disposed on a nanowire providing an electrical connection of increased electrical conductivity.

7. The dosimeter of claim 1 wherein the temperature sensor is comprised of one or more of a thermistor, semiconductor diode or Peltier thermoelectric device.

8. The dosimeter of claim 1 wherein the resistive heater and temperature sensor provide a means of closed-loop temperature control when coupled with external control circuitry.

9. The dosimeter of claim 1 wherein the micro-platform and nanowires are at least partially formed from the device layer of a single semiconductor-on-insulator SOI starting wafer.

10. The dosimeter of claim 1 wherein the micro-platform is comprised of a semiconductor device layer having a diffused transistor.

11. The dosimeter of claim 1 further comprising semiconductor circuits are created in and on the surrounding support platform.

12. The dosimeter of claim 1 wherein the device layer is comprised of one of silicon, germanium, silicon-germanium, silicon carbide, and gallium nitride.

13. The device of claim 1 wherein the nanowire first layer has a phonon mean-free-path greater than the distance between the nanoscaled or atomic boundaries that comprise the phononic scattering and/or phononic resonant structures.

14. The device of claim 1 wherein the nanowire first layer has an electron mean-free-path less than the distance between the atomic- or nano-scale boundaries comprise the phononic scattering and/or phononic resonant structures.

15. The dosimeter of claim 1 wherein the plurality of nanowires is further comprised of a second layer comprising one of silicon nitride, silicon oxynitride, aluminum oxide, and silicon dioxide providing a reduction of stress across the micro-platform.

16. The micro-platform of claim 1 having a maximum structural dimension of less than 10 millimeters.

17. The dosimeter of claim 1 wherein the micro-platform is temperature-cycled between ambient temperature and temperatures up to 1000° C.

18. The device of claim 1 wherein the dosimeter is maintained under vacuum and a second heater is covered with a gettering material such as titanium particles which upon heating provides a means of degassing within the vacuum volume.

19. The dosimeter of claim 1 configured to further provide a wearable sensor interfaced with a mobile phone providing an assay and presentation of the sensor data.

20. The dosimeter of claim 1 configured to further provide a dosimeter within a wired or wireless sensor network.

* * * * *